United States Patent [19]
Lin

[11] Patent Number: 5,906,437
[45] Date of Patent: May 25, 1999

[54] PROBE COVER FOR A TYMPANIC THERMOMETER

[75] Inventor: Kevin Lin, Hsinchu, Taiwan

[73] Assignee: Oriental System Technology Inc., Hsinchu, Taiwan

[21] Appl. No.: 08/872,165

[22] Filed: Jun. 10, 1997

[51] Int. Cl.$^6$ ............................... G01K 1/08; A61B 5/00; A61B 6/00; A61B 1/227
[52] U.S. Cl. .......................... 374/158; 600/474; 600/549
[58] Field of Search ..................................... 374/158, 209; 600/474, 549, 200, 203, 121, 186, 184

[56] References Cited

U.S. PATENT DOCUMENTS

| | | | |
|---|---|---|---|
| 5,163,418 | 11/1992 | Fraden et al. | 374/158 |
| 5,255,979 | 10/1993 | Ferrari | 374/158 |
| 5,645,350 | 7/1997 | Jang | 374/158 |
| 5,707,343 | 1/1998 | O'Hara et al. | 374/158 |

FOREIGN PATENT DOCUMENTS

| | | | |
|---|---|---|---|
| 406043037 | 2/1994 | Japan | 374/158 |
| 1541390 | 2/1979 | United Kingdom | 374/158 |

*Primary Examiner*—Diego Gutierrez
*Attorney, Agent, or Firm*—Bacon & Thomas, PLLC

[57] ABSTRACT

A probe cover assembly for covering and protecting the elongated probe of a tympanic thermometer. The probe cover includes an inner member, an outer member, and an intermediate transparent membrane. The inner member is mounted around the probe and includes an inner window in alignment with a distal opening of the probe and an inner flange having a projection. The outer member, closely mounted on the outer circumference of the inner member, includes an outer window in alignment with the inner window of the inner member, an outer flange, and a barb having a grip portion for biasing the inner flange of the inner member to push the projection against the outer flange of the outer member when the probe cover is in an assembled state. The intermediate transparent membrane, sandwiched between the outer member and the inner member, is gripped by the projection of the inner member and the outer flange of the outer member and is tightly stretched to cover the inner window of the inner member.

3 Claims, 6 Drawing Sheets

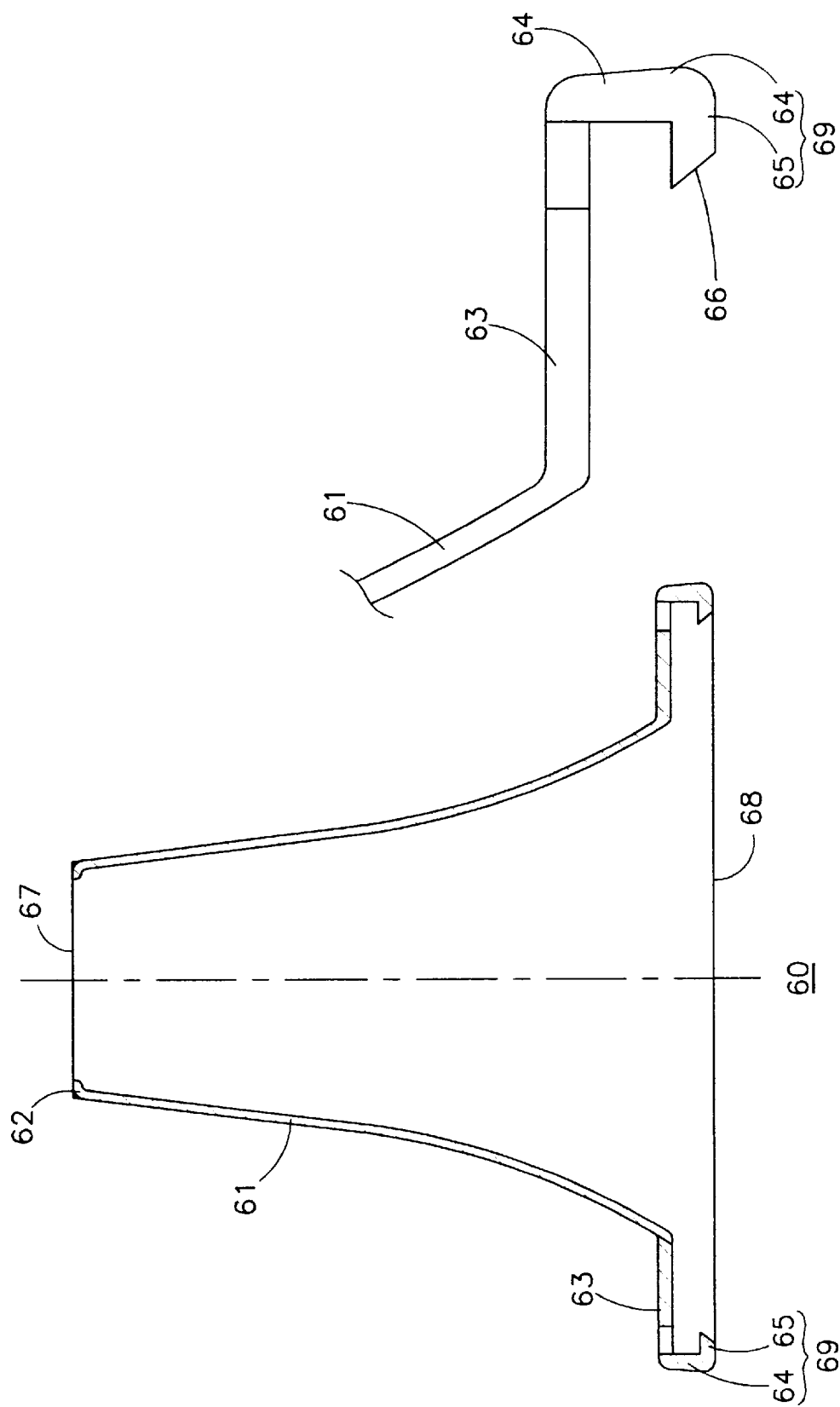

PROBE COVER FOR A TYMPANIC THERMOMETER

BACKGROUND OF THE INVENTION

1. Field of the Invention

The present invention relates to a probe cover, and more particularly, to a disposable probe cover for the probe of a tympanic thermometer.

2. Description of the Prior Art

Clinical thermometers are very helpful in the diagnosis of disease. The temperature of the tympanic membrane is generally considered to be superior to either oral, rectal or other auxiliary location for taking a patient's temperature because the tympanic membrane is more representative of the body's internal or core temperature. Temperature of the tympanic membrane can be measured by sensing infrared emissions emitted therefrom in the external ear canal. Besides, the infrared thermometers need less time when taking the patient's temperature reading. Therefore, the tympanic infrared thermometers have become more popular recently.

As seen in FIG. 1, in order to sense the infrared emissions in the ear canal, an elongated probe 11 must be partially inserted into the external ear canal. The infrared light emitted from the tympanic membrane passes through the window 12 at the distal opening 13 of the probe 11 and then is directed to the sensor of a thermometer by a waveguide (not shown). However, using such thermometers to measure the body's temperature of different patients raises a significant risk of contamination and spreading of disease. To preclude this risk, probes of such thermometers are protected with hygienic probe covers that are disposed of after each use. In addition to the sanitary barrier function, the probe covers should also fulfill the following additional functions. First, the probe cover must typically be transparent to light and having a wavelength in the far infrared range, or at least part of the probe cover must function as an infrared window. Also, the probe cover should provide for the easy and comfortable insertion of the probe into the ear canal.

Several devices have been suggested to accomplish these purposes. For example, a disposable speculum is disclosed in U.S. Pat. No. 4,662,360 to O'Hara et al. which includes a relatively rigid tubular body portion 22 and an infrared transparent membrane 21 attached to and sealing the distal end of the tubular body portion 22. The infrared transparent membrane 21 serving as the infrared window is made of polypropylene or polyethylene film that have a thickness in the range of 0.0005 to 0.001 inches. As seen in FIG. 2, the membrane 21 attaches to the outside of the distal end of tubular body portion 22, and a seam 23 is formed along the boundary. This seam 23 can be uncomfortable to patients if it protrudes excessively from the probe cover. On the other hand, the membrane may even fall into the ear canal if it is not securely attached.

Referring to FIG. 3, U.S. Pat. No. 5,163,418 to Fraden et al, there is disclosed a speculum probe cover which has a pleated sheath 33 to fit over the thermometer probe. The sheath is made from a single unitary piece of substantially infrared transparent film (approximately 0.001 inch thick) and the closed end of the sheath establishes an infrared window area 31. The periphery of pleated sheath 33 is attached to a ring shaped base 32 which is dimensioned to fit with the thermometer probe. Engagement of the base 32 of the probe cover onto the probe positions the infrared window area 31 across the path of infrared emission emitted from the tympanum. However, the pleats of the probe cover make the patients uncomfortable and the sheath itself makes a loud noise when being inserted into the ear canal. Besides, the infrared window area 31 may be ripped when the probe cover is applied onto the probe, which causes stray radiation of infrared emission that affects the accuracy of measured temperature.

Another probe cover is disclosed in U.S. Pat. No. 5,088,834 to Howe et al. Referring now to FIG. 4, a unitary probe cover includes a frustum-shaped sheath 43 which fits over the probe and a base 42 which is formed integrally with and extends around the periphery of the proximal end of the sheath 43 to hold the sheath over the probe. The sheath 43 is made of an infrared transparent material and is formed to have a thinner distal end portion terminating in a thin window 41 which has a thickness between 0.001 to 0.0005 inches and passes infrared radiation through the probe into the thermometer. Since the thickness of the wall of the sheath 43 is gradually reduced from 0.030 inch to 0.0005 inch, the thickness of the window 41 may vary after aging of the fabricating equipment. A thicker window can reduce the transparency to infrared emission while a thinner window may be easily broken. Also, a ripped window 41 may cause stray radiation of infrared emission that affects the accuracy of the measured temperature.

SUMMARY OF THE INVENTION

Accordingly, it is an object of the present invention to provide an improved probe cover having a smooth infrared window with uniform thickness so that the probe cover does not affect the accuracy of the measured temperature.

It is another object of the present invention to provide a probe cover for a tympanic thermometer that does not make the patients feel uncomfortable.

According to the first aspect of the present invention, the probe cover for the probe of a tympanic thermometer with the probe having, at one end thereof, a proximal portion attached to the thermometer and, at the opposite end thereof, a distal opening, which probe cover comprising:

an inner member mounted around the proximal portion of the probe, including: a hollow frusto-conical shaped inner wall having an inner small end near the distal opening of the probe and an inner large end on the opposite side of the inner small end; an inner window formed at the inner small end and being in alignment with the distal opening of the probe along the axis of the hollow frusto-conical shape; and an inner flange extending outward from the inner large end with a projection protruding toward the inner small end;

an outer member closely mounted on the outer circumference of the inner member, including: a hollow frusto-conical shaped outer wall having an outer small end in alignment with the inner small end and an outer large end on the opposite side of the outer small end; an outer window formed by extending slightly from the outer small end toward the axis of the hollow frustum cone and being in alignment with the inner window; an outer flange extending outward from the outer large end; and a barb having a stretch portion extending toward the opposite side of the outer small end from the outer circumference of the outer flange and a grip portion extending radially inwards from one end of the stretch portion, the grip portion biasing the inner flange of the inner member so as to push the projection against the outer flange of the outer member when the probe cover is in an assembled state; and an intermediate transparent membrane sandwiched between the interior of the outer wall of the outer member and the exterior of the inner wall of the inner member, the membrane being gripped by the projection of the inner member and the outer flange of the outer member and being tightly stretched to cover the inner window of the inner member.

According to the second aspect of the present invention, the probe cover for the probe of a tympanic thermometer with the probe having, at one end thereof, a proximal portion attached to the thermometer and, at the opposite end thereof, a distal opening, which probe cover comprising:

an inner member mounted around the proximal portion of the probe, including: a hollow frusto-conical shaped inner wall having an inner small end near the distal opening of the probe and an inner large end on the opposite side of the inner small end; and an inner window formed at the inner small end and being in alignment with the distal opening of the probe along the axis of the hollow frusto-conical shape;

an outer member closely mounted on the outer circumference of the inner member, including: a hollow frusto-conical shaped outer wall having an outer small end in alignment with the inner small end and an outer large end on the opposite side of the outer small end; and an outer window formed by extending slightly from the outer small end toward the axis of the hollow frustum cone and being in alignment with the inner window; and an intermediate transparent membrane sandwiched between the interior of the outer wall of the outer member and the exterior of the inner wall of the inner member, the membrane being tightly stretched to cover the inner window of the inner member;

the inner and outer members being bonded together by ultrasonic welding after the membrane is loaded so as to fix the intermediate transparent membrane firmly between the inner member and the outer member.

BRIEF DESCRIPTION OF THE DRAWINGS

FIG. 6A is a longitudinal sectional view of the outer member in the probe cover shown in FIG. 5;

FIG. 6B is a partially enlarged view of FIG. 6A;

DETAILED DESCRIPTION OF THE PREFERRED EMBODIMENTS

Figure 5:
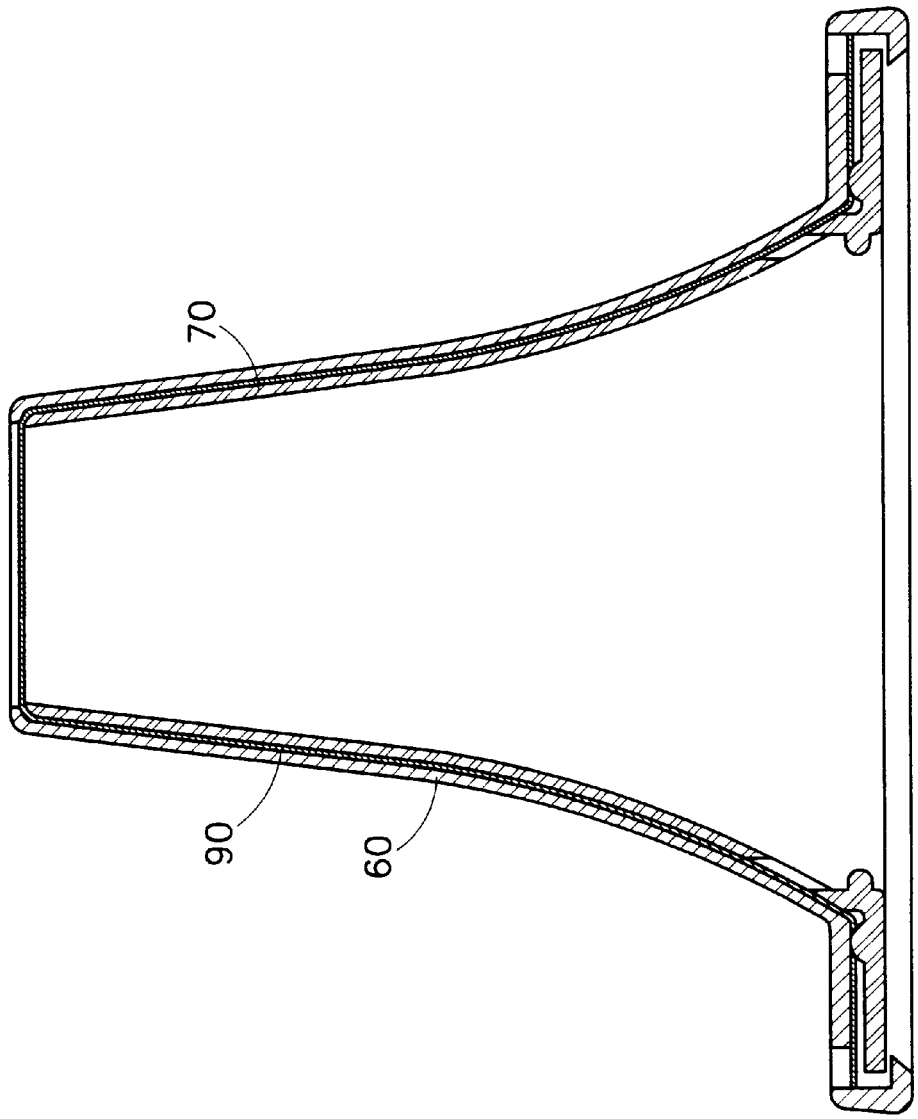
FIG. 5 is a longitudinal sectional view of the assembled probe cover according to the first embodiment of the present invention.

Referring to FIG. 5, the probe cover according to the first embodiment of the present invention consists of an outer member 60, an inner member 70, and an intermediate transparent membrane 90 sandwiched between the inner member 70 and the outer member 60.

Figure 2:
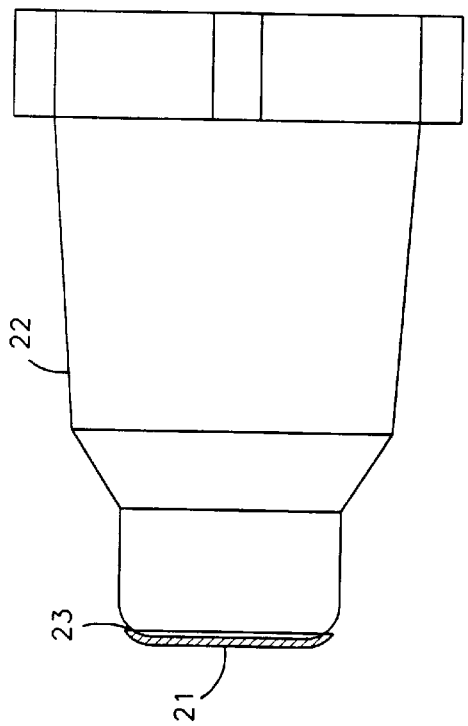
FIG. 2 is a side view of a prior art probe cover.
Figure 1:
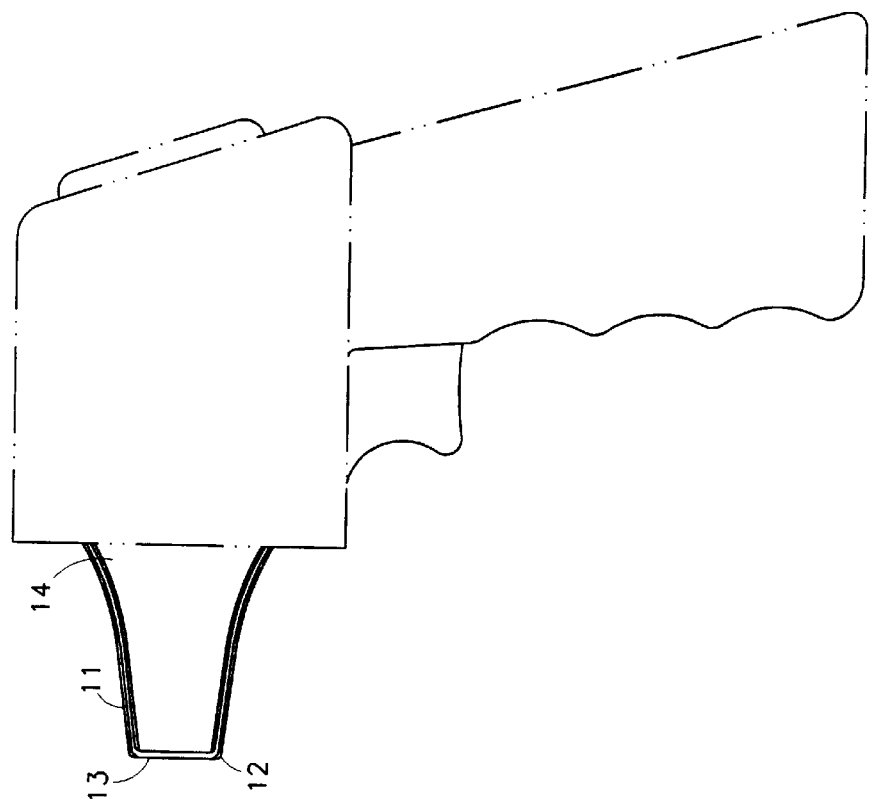
FIG. 1 is a prior art schematic view showing a tympanic thermometer.
Figure 4:
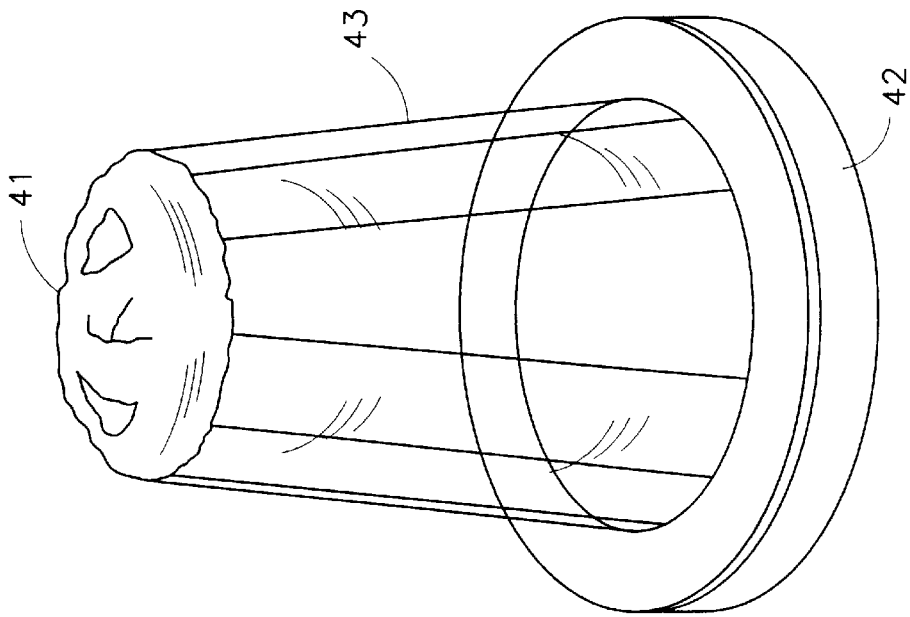
FIG. 4 is a perspective view of yet another prior art probe cover.
Figure 3:
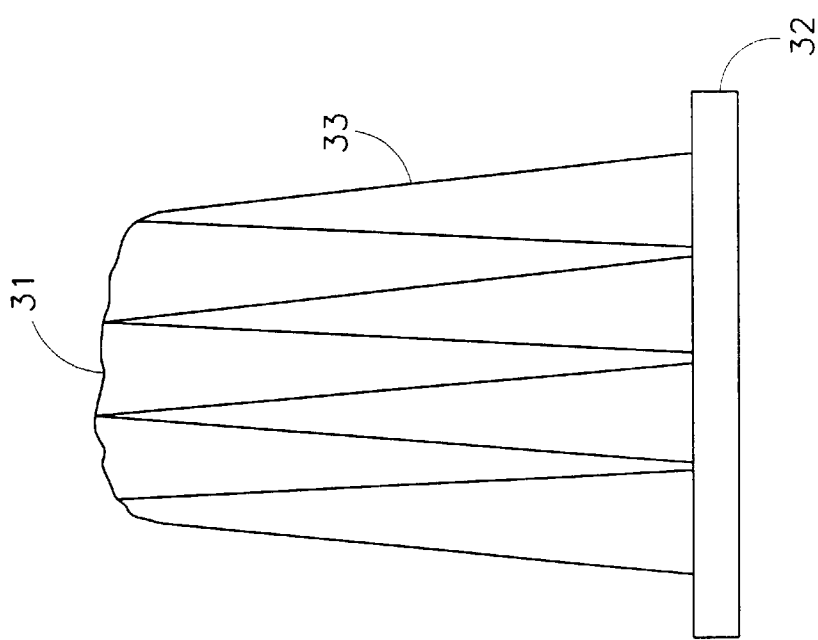
FIG. 3 is a side view of another prior art probe cover.

The outer member 60, referring to FIG. 6A, includes a hollow frusto-conical shaped outer wall 61 which has a small opening 67 at one end and a large opening 68 at the other end. An outer window 62, where the infrared light passes through, is formed by extending outer wall 61 inward from the small opening 67 with a curved corner that is in alignment with the distal opening 13 (see FIG. 1) of the probe along the axis of the hollow frusto-conical shape. There is an outer flange 63 extending outward from the large opening 68 of the outer wall 61. A barb 69 protrudes downwardly from the outer circumference of the outer flange 63 toward the side opposite to the small opening 67. The barb 69 consists of a stretch portion 64 and a grip portion 65(FIG. 6B). The stretch portion 64 extends counter to the outer wall 61 from the outer circumference of the outer flange 63. The grip portion 65 is formed by extending inwardly toward the central axis of the outer wall 61 from one end of the stretch portion 64. As seen in FIG. 6B, the forward end of the grip portion 65 has an inclined plane 66.

Figure 7B:
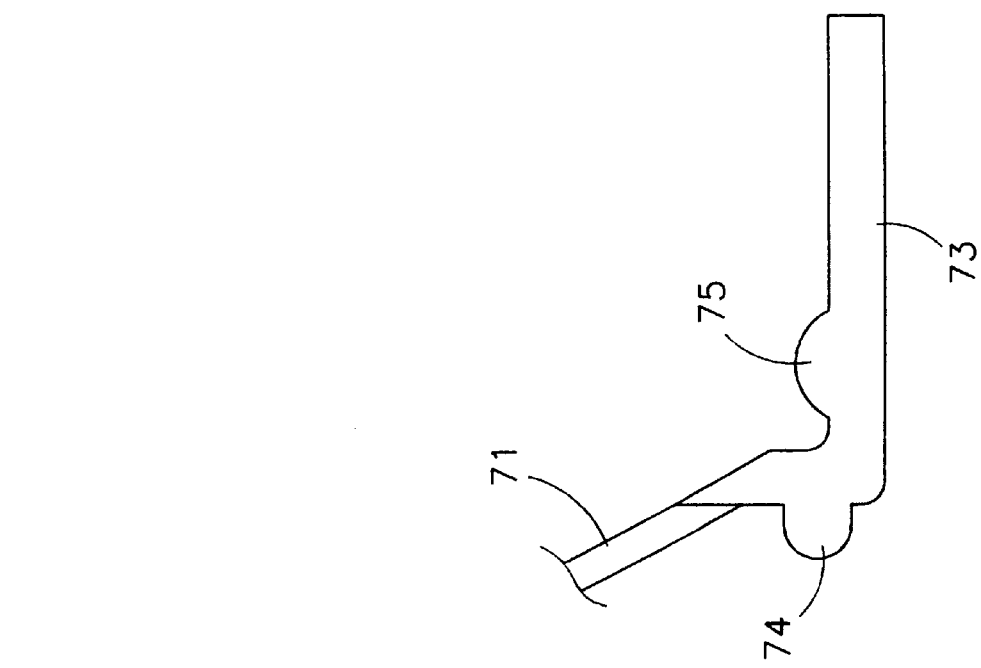
FIG. 7B is a partially enlarged view of FIG. 7A.
Figure 7A:
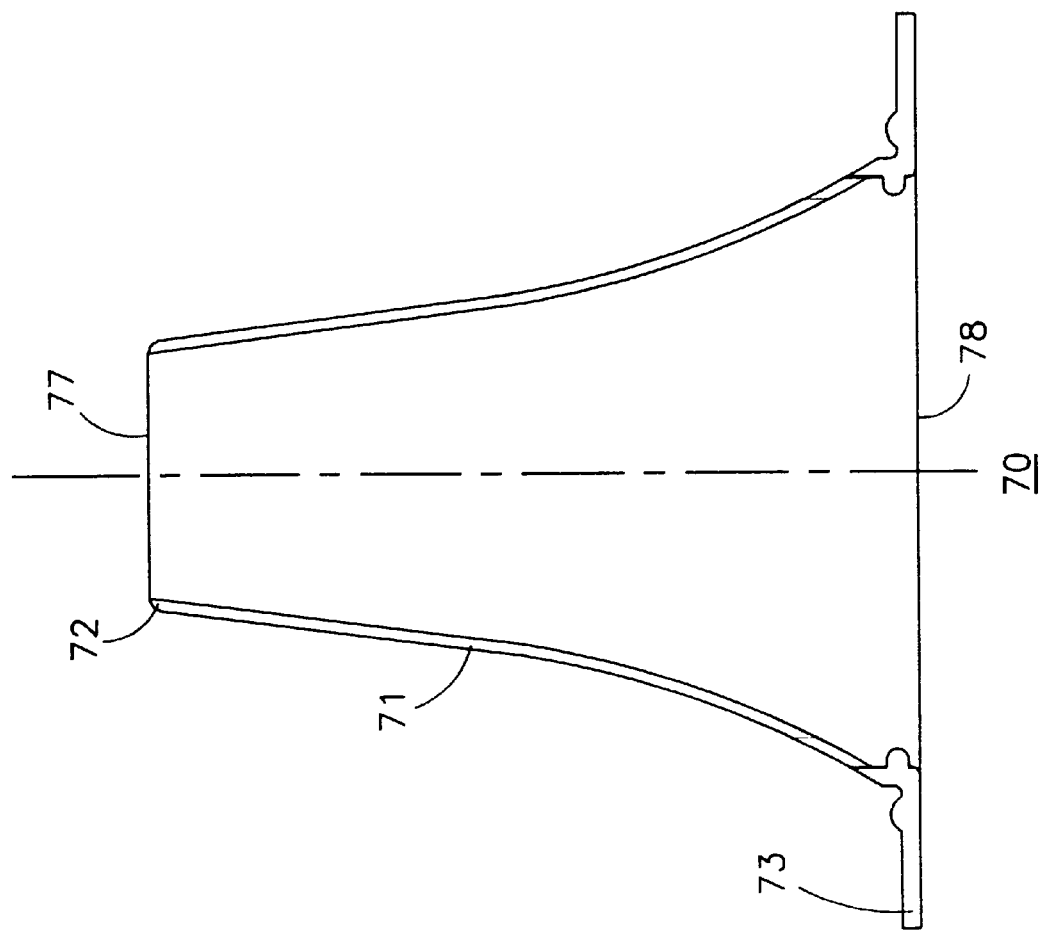
FIG. 7A is a longitudinal sectional view of the inner member in the probe cover shown in FIG. 5.

Referring now to FIG. 7A, the inner member 70 includes an inner wall 71, an inner window 72, and an inner flange 73. The inner wall 71 has a hollow frusto-conical shape which has a small opening 77 at one end and a large opening 78 at the other end. The inner window 72, where the infrared light passes through, is formed at the small opening 77 of the inner wall 71 and is in alignment with the outer window 62 of the outer member 60 in an assembled state (FIG. 5). The inner flange 73 is formed at the large opening 78 of the inner wall 71. Referring now also to FIG. 7B, the inner flange 73 extends outward from the end of the large opening 78 of inner wall 71. Projection 75 is formed at the proximal portion of the inner flange 71 and extends toward the side of the inner window 72.

When assembling the outer member 60, inner member 70, and intermediate transparent membrane 90, the membrane 90 is placed between the outer member 60 and the inner member 70, then the inner member 70 is pushed toward the outer member 60. As the inner member 70 approaches the outer member 60, the edge of the outer circumference of the inner flange 73 contacts the grip portion 65 of the outer member. Since the end of the grip portion 65 has an inclined plane 66, the inner flange 73 can be easily guided into the barb 69 of the outer member 60 and the probe cover of the present invention is thus assembled. Since the shapes of the outer wall 61 and the inner wall 71 are substantially equal, the membrane 90 is tightly sandwiched and fixed between them. In addition, as the barb 69 of the outer member 60 biases the inner flange 73 toward the outer flange 63, the projection 75 on the inner flange 73 compresses the periphery of membrane 90 and the membrane 90 is further tightly stretched to cover the inner window of the inner member 70. When the assembled probe cover is applied onto the probe of a tympanic thermometer, the inward projection 74 of the inner member 70 mates with the recess in the proximal portion of the probe to retain the probe cover on the probe.

The intermediate transparent membrane 90 covers the window area of this probe cover, and infrared light emitted from the tympanum passes through it to enter the waveguide of the tympanic thermometer. Therefore, the absorbance of the membrane and the stray radiation caused by the membrane affect the accuracy of the measured temperature. The membrane is made of an infrared transparent material like polyethylene or polypropylene with a uniform thickness, substantially 20 $\mu$m to 30 $\mu$m, such that the membrane provides a minimal and constant absorption and has a sufficient strength to avoid puncturing. Besides, since the portion of membrane 90 covering the inner window 72 is tensed and smoothly expanded by sandwiching of the outer wall 61 and inner wall 71, the stray radiation caused by the membrane is reduced to a minimum. According to the aforesaid optical characteristics we can get a more accurate measured temperature by using the probe cover of the present invention.

The exterior of the outer member 60, where the probe cover contacts the ear canal, is designed to make the patients feel comfortable. No seams, pleats, sharp corners, or projections is formed on the portion that may contact the ear canal. The outer member 60 is made of a material that is non-toxic and is somewhat pliable such that it may be deformed slightly to facilitate insertion into the ear canal. As seen in FIG. 6A, the outer window 62 is formed by projecting outer wall 61 inward from the small opening 67 with a curved corner. When the probe cover enters the ear canal, the curved corner of the outer window 62 makes the movement of the probe cover more smoothly. On the other hand, since the transparent membrane is tightly fastened by the inner and outer members 70 and 60, noise caused by the membrane no longer exists. Because the probe cover is inserted into the ear canal, any slight noise sounds like a loud clatter to the patient. Taken together, accuracy and comfort are important advantages of the present invention.

Figure 8:
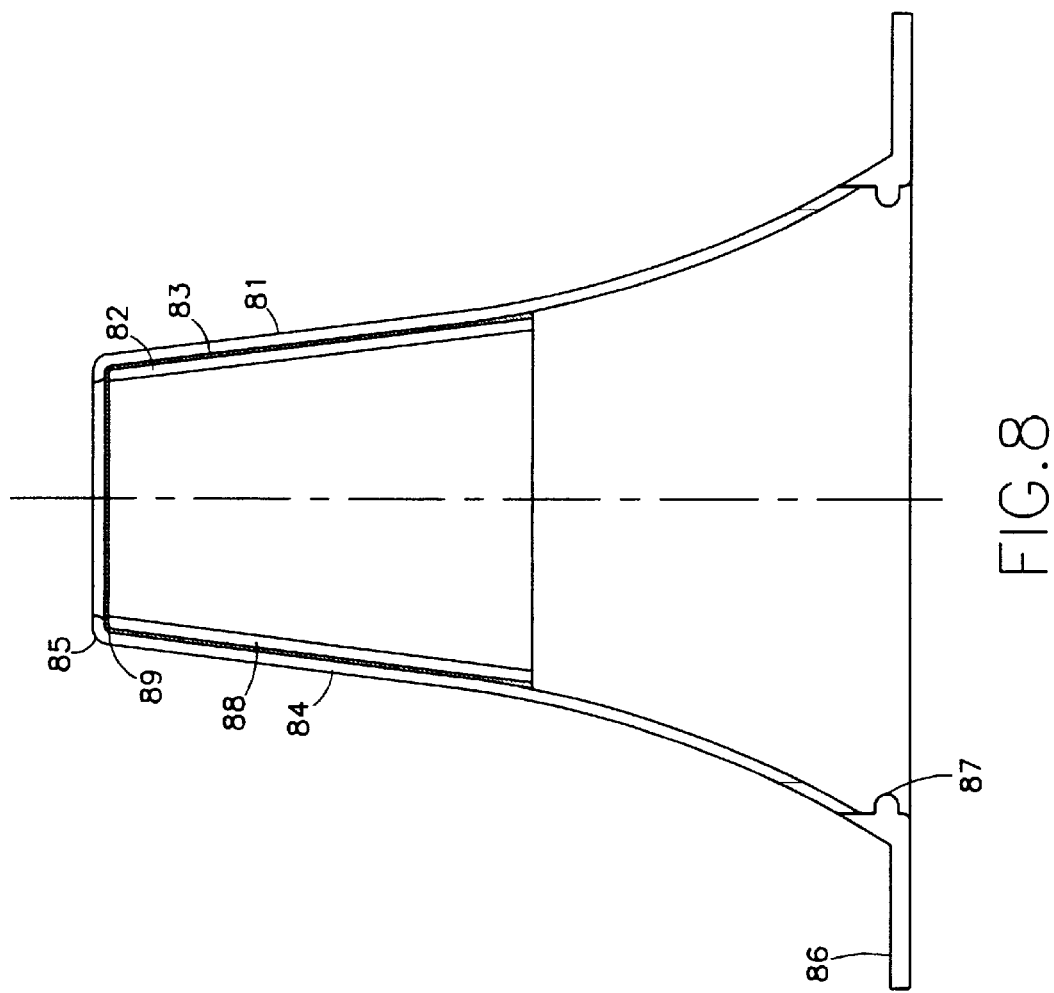
FIG. 8 is a longitudinal sectional view of the assembled probe cover according to the second embodiment of the present invention.

Referring now to FIG. 8, there is shown the second embodiment of the present invention. A probe cover for the probe of a tympanic thermometer is composed of an outer member 81, an inner member 82, and an intermediate transparent membrane 83.

The outer member 81 includes a hollow frusto-conical shaped outer wall 84 which has a small opening at one end and a large opening at the other end. An outer window 85, where the infrared light passes through, is formed by projecting outer wall 84 inward from the small opening with a curved corner and is in alignment with the small opening of the probe cover along the axis of the hollow frusto-conical shape. There is a flange 86 extending outward from the large opening of the outer wall 84. At the opposite side to flange 86 there is an inward projection 87 which projects toward the axis of the outer wall 84.

The inner member 82 consists of the inner wall 88 and inner window 89. The inner wall 88 has a hollow frusto-conical shape that similar to the shape of the outer wall 84. The inner window 89, where the infrared light passes through, is formed at the small opening of the inner wall 88 and is in alignment with the outer window 85 of the outer member 81.

When assembling the probe, the intermediate transparent membrane 83 is placed between the outer member 81 and the inner member 82, then the inner member 82 is pushed toward the outer member 81. As the inner member 82 approaches the outer member 81, since the shapes of the outer wall 84 and the inner wall 88 are substantially equal, the membrane 83 is tightly sandwiched and fixed therebetween. The outer member 81, inner member 82, and intermediate transparent membrane 83 are further bound together by ultrasonic welding. When the assembled probe cover is applied onto the probe of a tympanic thermometer, the inward projection 87 of the outer member 81 mates with the recess in the proximal portion of the probe to retain the probe cover on the probe.

Similar to the first embodiment of the present invention, the membrane 83 is made of an infrared transparent material like polyethylene or polypropylene with a uniform thickness, substantially 20 $\mu$m to 30 $\mu$m, such that the membrane provides a minimal and constant absorption and has a sufficient strength to avoid puncturing. Besides, the stray radiation caused by the membrane is reduced to a minimum. The exterior of the outer member, where the probe cover contacts the ear canal, is designed to make the patients feel comfortable. No seams, pleats, sharp corners, or projections is formed on the portion that may contact the ear canal. When the probe cover enters the ear canal, the curved corner of the outer window 85 makes the probe cover glide more easily. On the other hand, the transparent membrane is tightly fastened by the inner and outer members 82 and 81, noise caused by the membrane no longer exists. Taken together, accuracy and comfort are also accomplished by the second embodiment of the present invention.

Though the present invention is described by preferred embodiments, it should be apparent to those skilled in the art that the invention may be modified in both arrangement and detail. Therefore, the scope of the appended claims should be accorded the broadest interpretation so as to encompass all such modifications and similar arrangements.

I claim:

1. A probe cover for the probe of a tympanic thermometer with the probe having, at one end thereof, a proximal portion attached to the thermometer and, at the opposite end thereof, a distal opening, said probe cover comprising:

an inner member for mounting around the proximal portion of a probe, the inner member including a hollow frusto-conical shaped inner wall having an inner small end near the distal opening of the probe and an inner large end on an opposite side of said inner small end; an inner window formed at said inner small end and being in alignment with the distal opening of the probe along a central axis of the hollow frusto-conical shaped inner wall; and an inner flange extending outward from said inner large end, the flange including a projection protruding toward the inner small end;

an outer member closely mounted on the outer circumference of said inner member, the outer member including a hollow frusto-conical shaped outer wall having an outer small end in alignment with said inner small end and an outer large end on the opposite side of said outer small end; an outer window formed by extending said outer small end toward a central axis of a hollow frustum cone defined by the outer wall and being in alignment with said inner window; an outer flange extending outward from said outer large end; and a barb having a stretch portion extending away from said outer small end from the outer circumference of said outer flange and a grip portion extending radially inwards from an end of said stretch portion, said grip portion biasing said inner flange of said inner member to push said projection against said outer flange of said outer member when said probe cover is in an assembled state; and an intermediate transparent membrane sandwiched between the interior of said outer wall of said outer member and the exterior of said inner wall of said inner member, said outer membrane being gripped by said projection of said inner member and said outer flange of said outer member and being tightly stretched to cover said inner window of said inner member.

2. A probe cover for the probe of a tympanic thermometer as described in claim 1 wherein said outer member has an inclined guiding plane at the radially inward end of said grip portion to guide said inner member upon assembling.

3. A probe cover for the probe of a tympanic thermometer as described in claim 1 or 2 wherein said intermediate transparent membrane is made of polymer with a thickness substantially between 20 to 30 $\mu$m.

* * * * *